US012092973B2

(12) United States Patent
Ozaki et al.

(10) Patent No.: US 12,092,973 B2
(45) Date of Patent: Sep. 17, 2024

(54) IMAGE FORMING APPARATUS

(71) Applicant: CANON KABUSHIKI KAISHA, Tokyo (JP)

(72) Inventors: Goshi Ozaki, Kanagawa (JP); Hiroyuki Munetsugu, Kanagawa (JP); Shinichi Nishida, Kanagawa (JP); Sohta Sugimoto, Kanagawa (JP); Mitsuhiro Sato, Tokyo (JP); Masahiro Suetsugu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/213,968

(22) Filed: Jun. 26, 2023

(65) Prior Publication Data

US 2024/0069467 A1 Feb. 29, 2024

(30) Foreign Application Priority Data

Aug. 30, 2022 (JP) ................................ 2022-137307

(51) Int. Cl.
*G03G 15/08* (2006.01)

(52) U.S. Cl.
CPC ..... *G03G 15/0874* (2013.01); *G03G 15/0896* (2013.01); *G03G 2215/0682* (2013.01)

(58) Field of Classification Search
CPC ........... G03G 15/0874; G03G 15/0894; G03G 15/0896
USPC ......................... 399/107, 108, 110, 125, 262
See application file for complete search history.

(56) References Cited

U.S. PATENT DOCUMENTS

| | | | | |
|---|---|---|---|---|
| 10,915,060 | B2 | 2/2021 | Kawai et al. | |
| 11,526,099 | B2 | 12/2022 | Nogami et al. | |
| 2021/0109460 | A1* | 4/2021 | Kubo | G03G 15/0894 |
| 2022/0155708 | A1* | 5/2022 | Sato | G03G 15/0874 |
| 2022/0171311 | A1 | 6/2022 | Suzuki et al. | |
| 2023/0048810 | A1 | 2/2023 | Nogami et al. | |
| 2023/0168601 | A1 | 6/2023 | Fukui et al. | |

FOREIGN PATENT DOCUMENTS

| | | |
|---|---|---|
| JP | 2021-026218 A | 2/2021 |
| JP | 2022-085402 A | 6/2022 |

* cited by examiner

*Primary Examiner* — Hoan H Tran
(74) *Attorney, Agent, or Firm* — VENABLE LLP

(57) ABSTRACT

An image forming apparatus includes a first unit including an image bearing member and a second unit. The second unit includes a developing roller to supply the toner to the image bearing member, a mounting portion in which the replenishing container is dismountably mounted, and an accommodating portion to accommodate the toner replenished from the replenishing container. The second unit is movable between a first position where the developing roller contacts the image bearing member and a second position where the developing roller separates from the image bearing member. When a moving direction in which the second unit moves from the first position toward the second position is defined as a separating direction, the second unit is urged in the separating direction by a force which the mounting portion receives from the replenishing container when the replenishing container is mounted to the mounting portion.

12 Claims, 14 Drawing Sheets

IMAGE FORMING APPARATUS

FIELD OF THE INVENTION AND RELATED ART

This invention relates to an image forming apparatus which forms an image on a recording material.

An image forming apparatus with an electrophotographic method forms an image on a recording material by transferring a developer image (a toner image) formed on a surface of an image bearing member (a photosensitive drum) onto a recording material. In Japanese Laid-Open Patent Application No. 2021-26218, the image forming apparatus providing a replenishing portion including a detachable replenishing container accommodating a developer and a system that a developer is replenished from outside of the apparatus (toner replenishing method) by connecting a replenishing container with the replenishing portion when the developer is low in the apparatus is disclosed.

Also, some image forming apparatuses are provided with a system that a developing roller is in contact with and separated from the image bearing member. In Japanese Laid-Open Patent Application No. 2022-85402, a system which can suppress a force by mounting the replenishing container affecting the photosensitive drum through the developing roller in the image forming apparatus with the toner replenishing method which the developing roller is in contact with and separated from the photosensitive drum is disclosed. According to this application, a supporting member receives a force by mounting the replenishing container through a developing unit by providing the supporting member that supports the developing unit in the state the developing unit is in position where the developing roller is separated from the photosensitive drum.

However, in Japanese Laid-Open Patent Application No. 2022-85402 described above, the developing unit is structured to urge the developing roller to come closer to the photosensitive drum by the force applied when the replenishing container is mounted.

Thereat, an object of the present invention is to provide an image forming apparatus providing a new system that is able to prevent the force applied when the replenishing container is mounted from affecting the image bearing member through the developing roller.

SUMMARY OF THE INVENTION

To solve the problem as described above, the present invention provides as follows: an image forming apparatus to which a replenishing container for replenishing toner is detachably mountable, the image forming apparatus comprising a first unit including an image bearing member; and a second unit including a developing roller configured to supply the toner to the image bearing member, a mounting portion in which the replenishing container is dismountably mounted, and an accommodating portion configured to accommodate the toner replenished from the replenishing container, the second unit being movable between a first position where the developing roller contacts the image bearing member and a second position where the developing roller separates from the image bearing member, wherein when a moving direction in which the second unit moves from the first position toward the second position is defined as a separating direction, the second unit is configured to be urged in the separating direction by a force which the mounting portion receives from the replenishing container when the replenishing container is mounted to the mounting portion.

Further features of the present invention will become apparent from the following description of exemplary embodiments with reference to the attached drawings.

Figure 2:
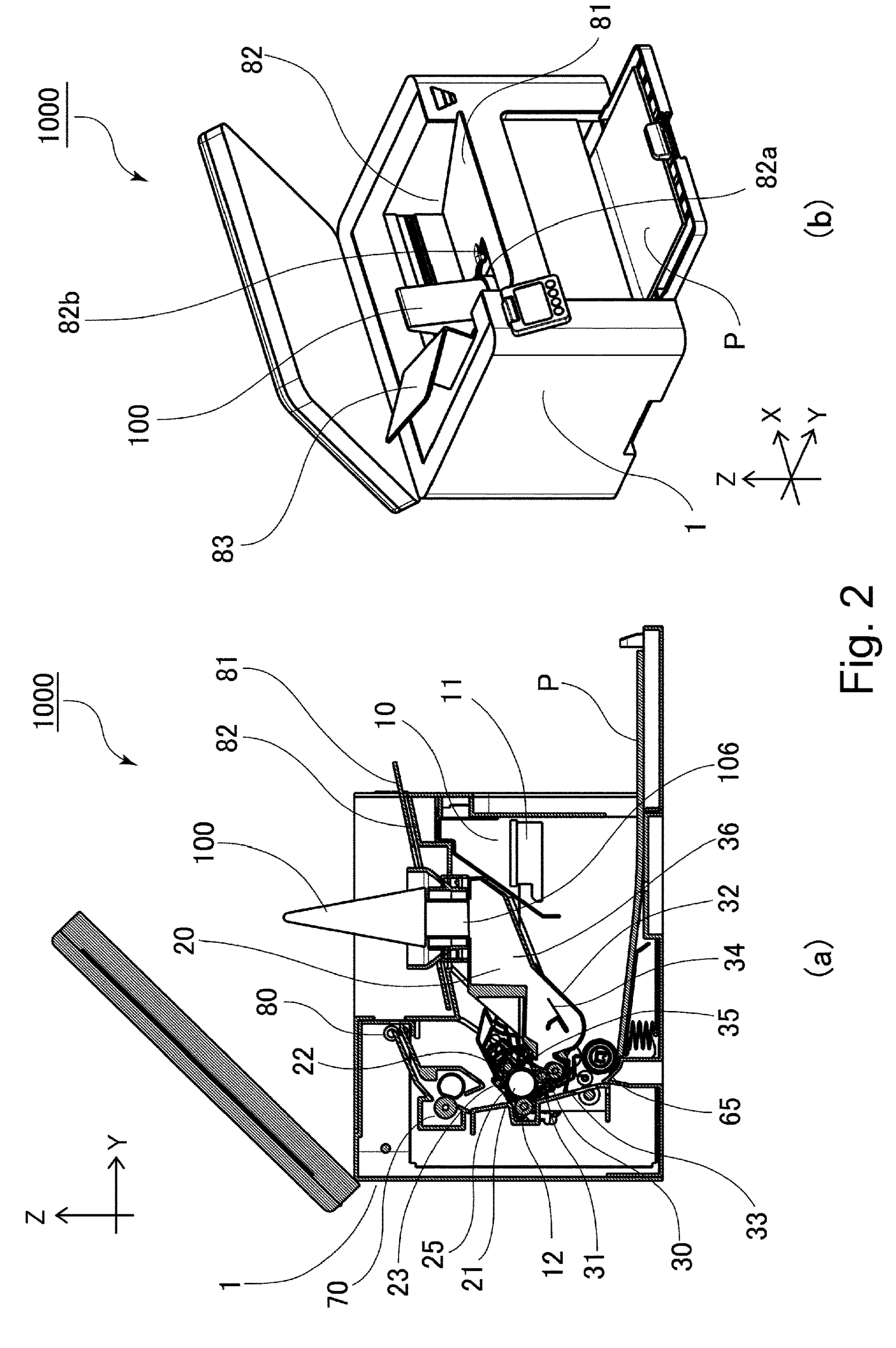

Part (a) and part (b) of FIG. 2 are a schematic view and a perspective view showing an image forming system in the embodiment 1.

Figure 3:
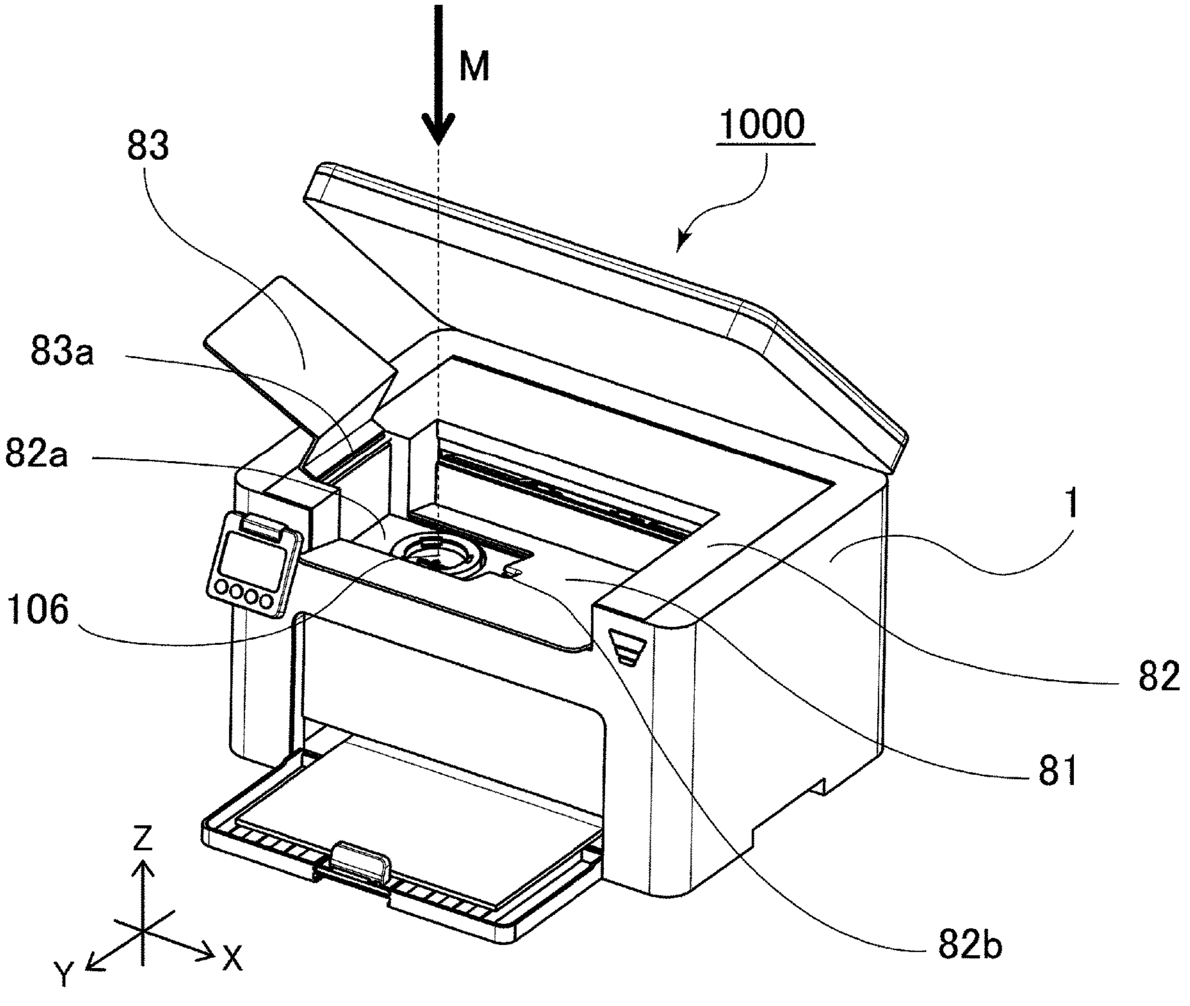

FIG. 3 is a schematic view showing an image forming apparatus in the embodiment 1.

Figure 4:
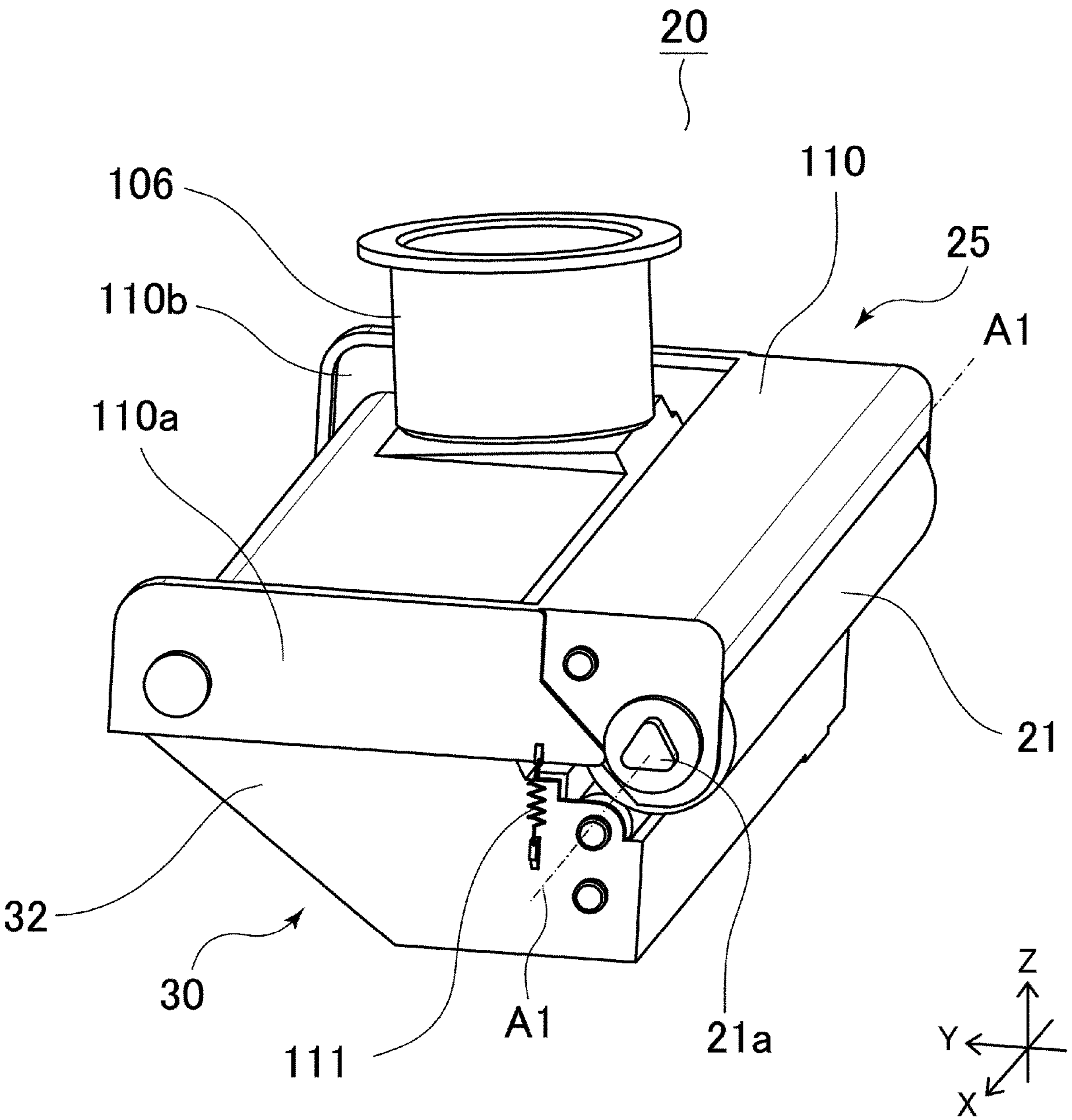

FIG. 4 is a perspective view showing the process unit in the embodiment 1.

Figure 5:
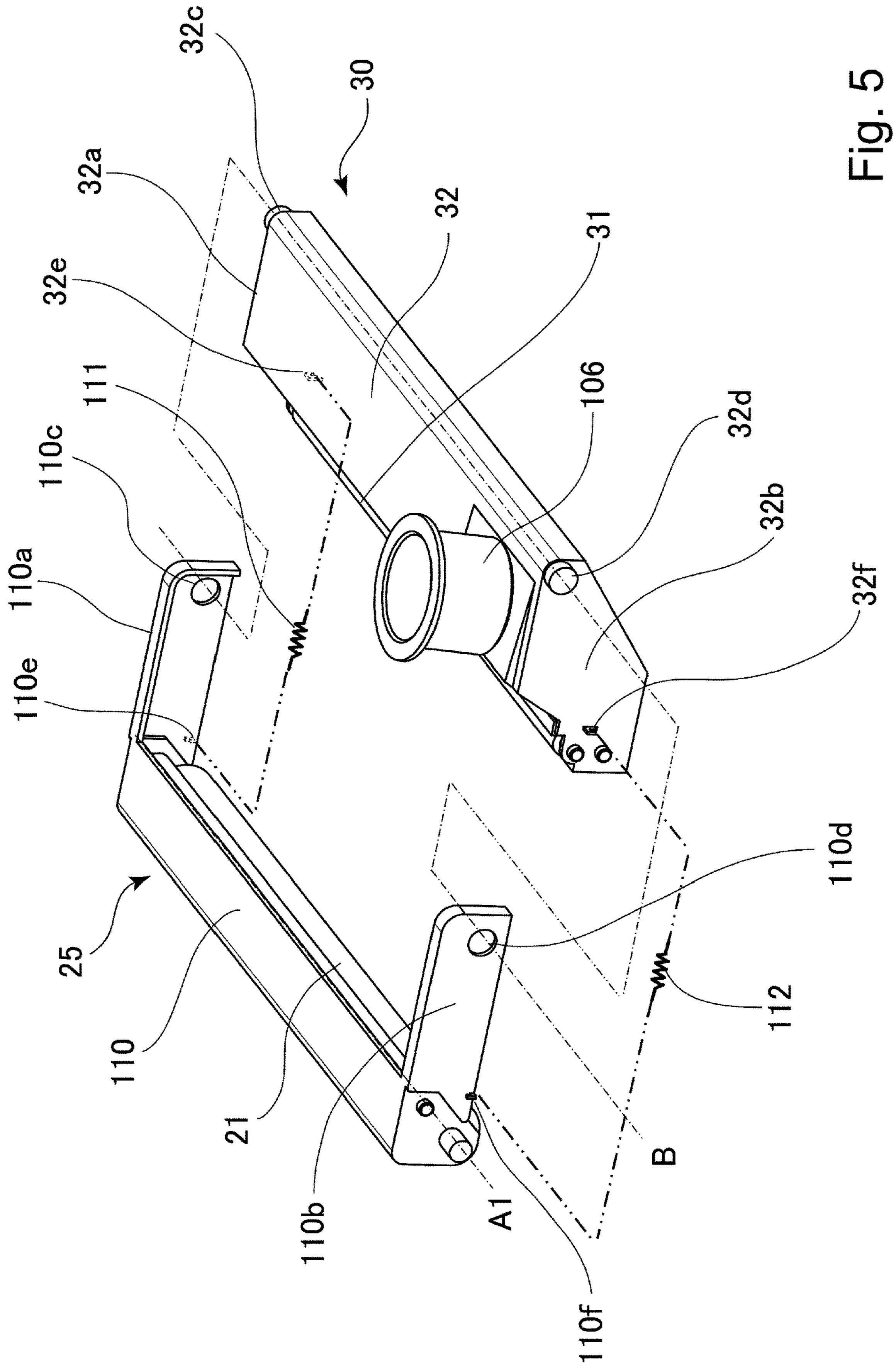

FIG. 5 is a disassembling view showing the process unit in the embodiment 1.

Figure 6:
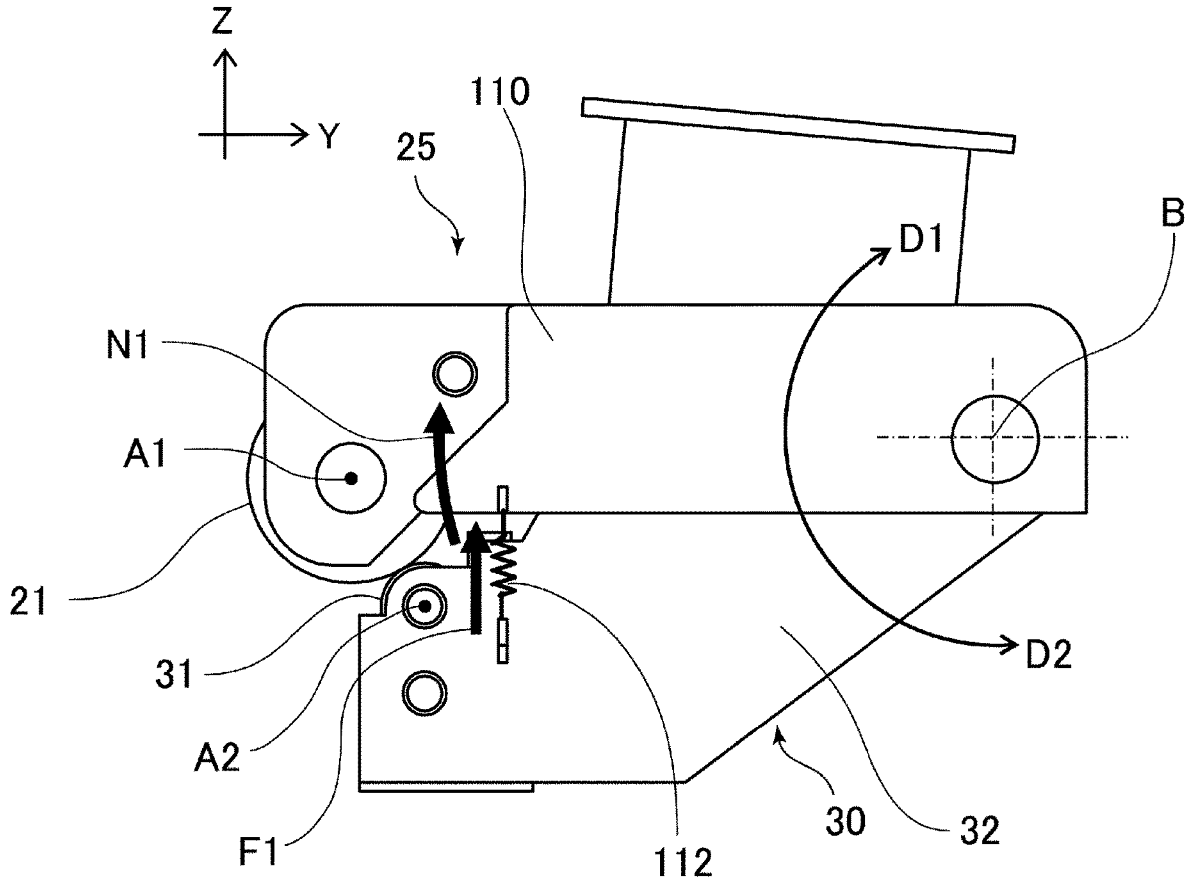

FIG. 6 is a side view showing the process unit in the embodiment 1.

Figure 7:
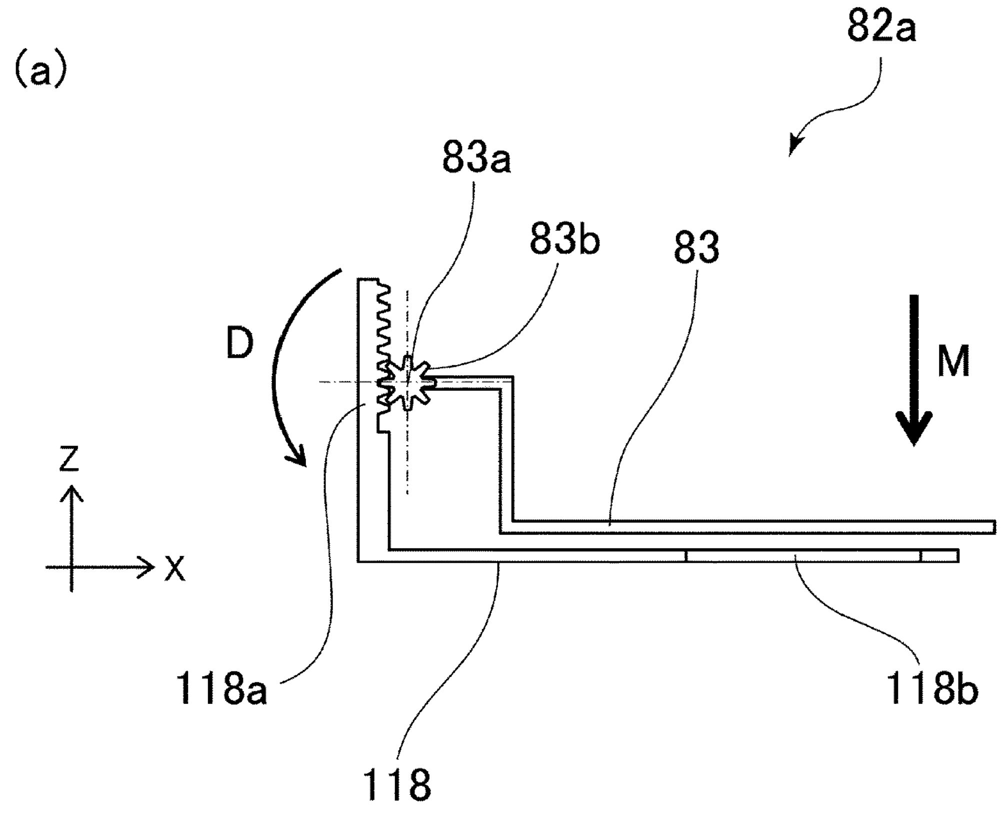
Figure 7:
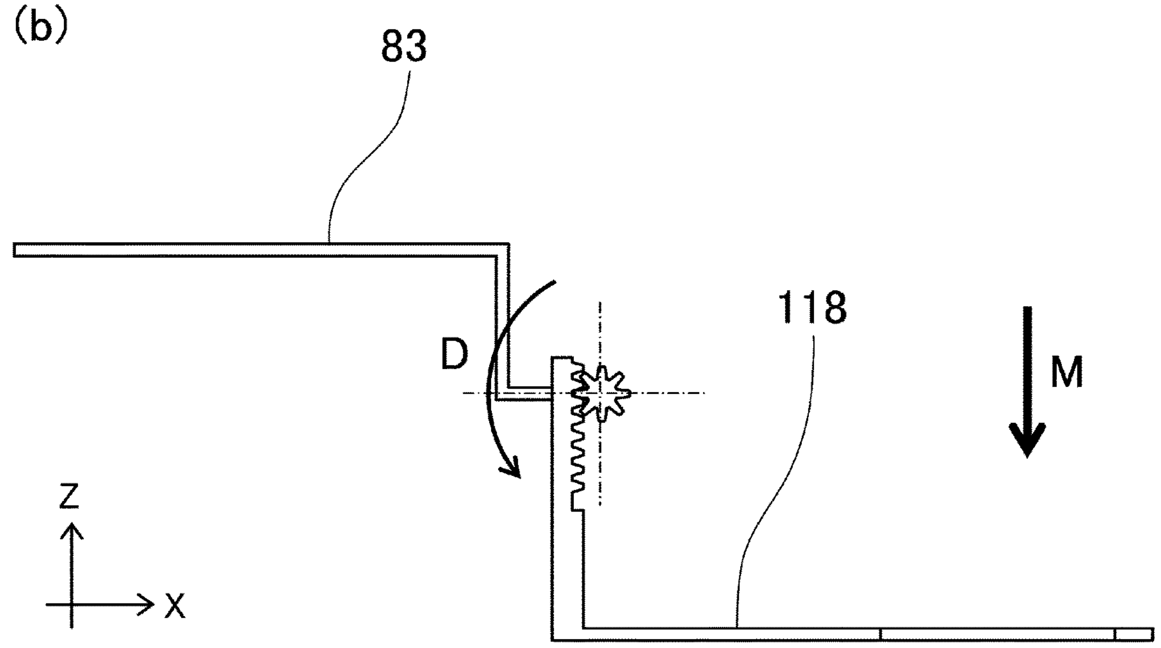

FIG. 7, part (a) and part (b), is an explanatory view showing an opening/closing member and a pressing plate in the embodiment 1.

Figure 8:
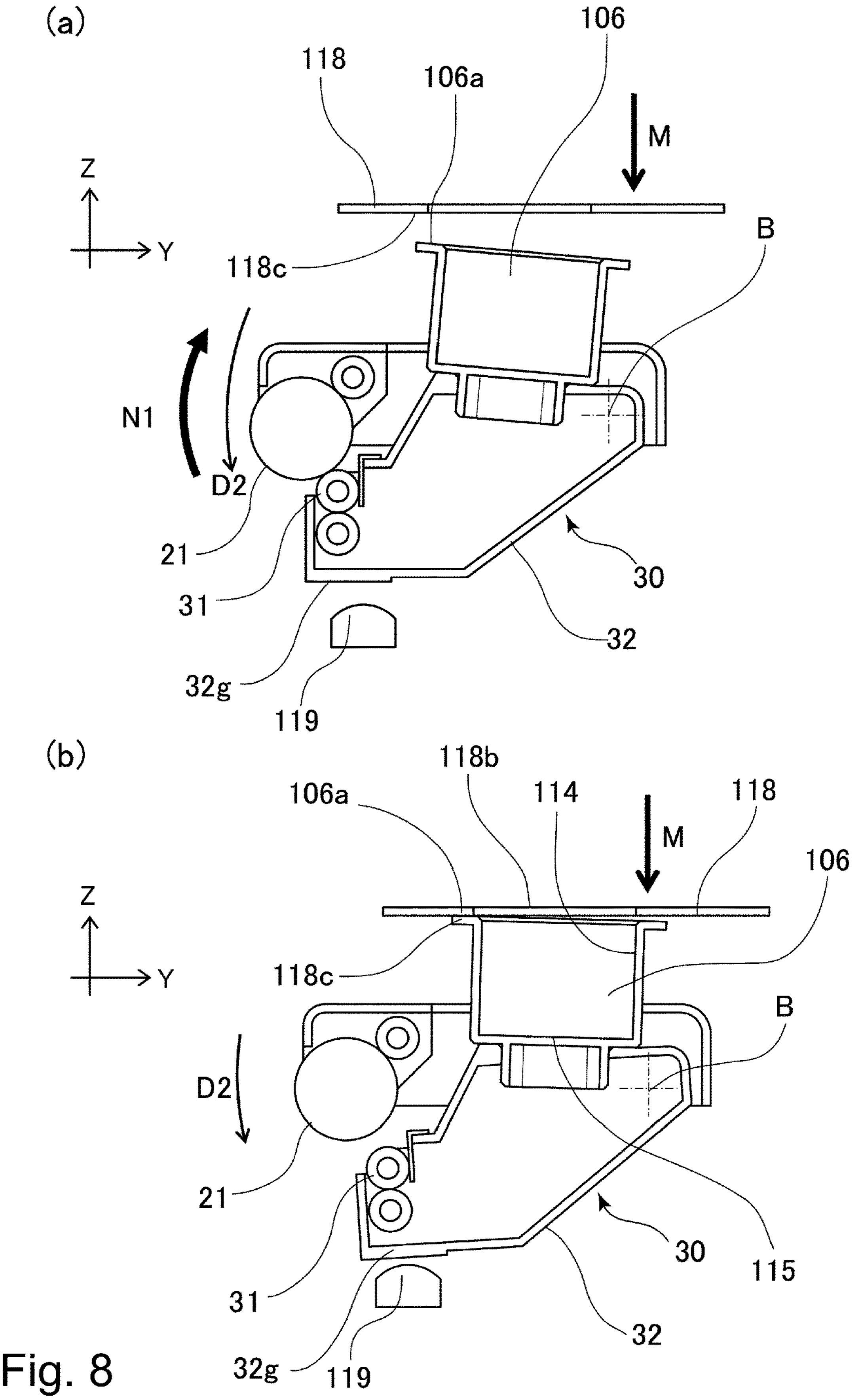

FIG. 8, part (a) and part (b), is an explanatory view showing the pressing plate in the embodiment 1.

Figure 9:
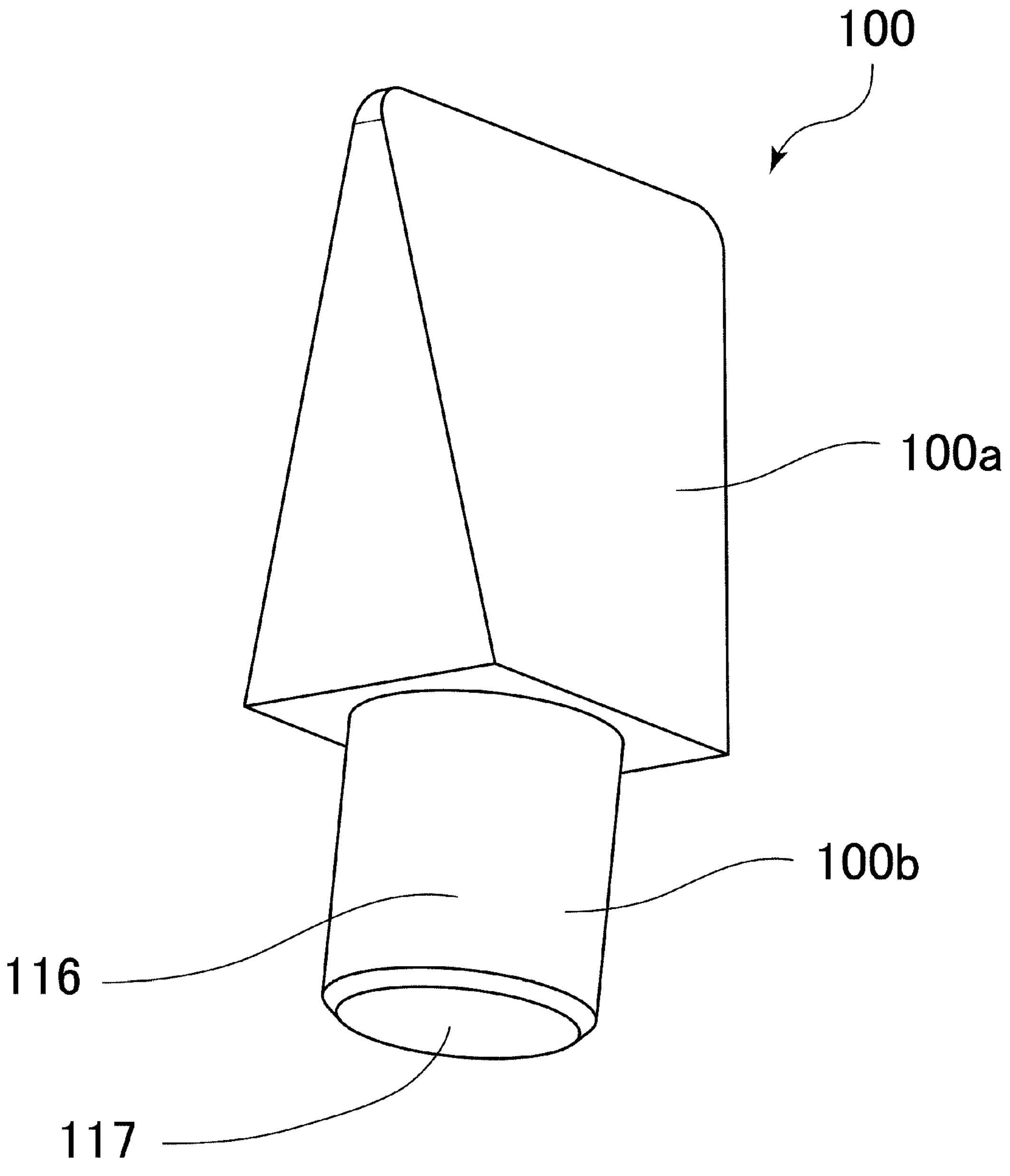

FIG. 9 is a perspective view showing a toner pack in the embodiment 1.

Figure 10:
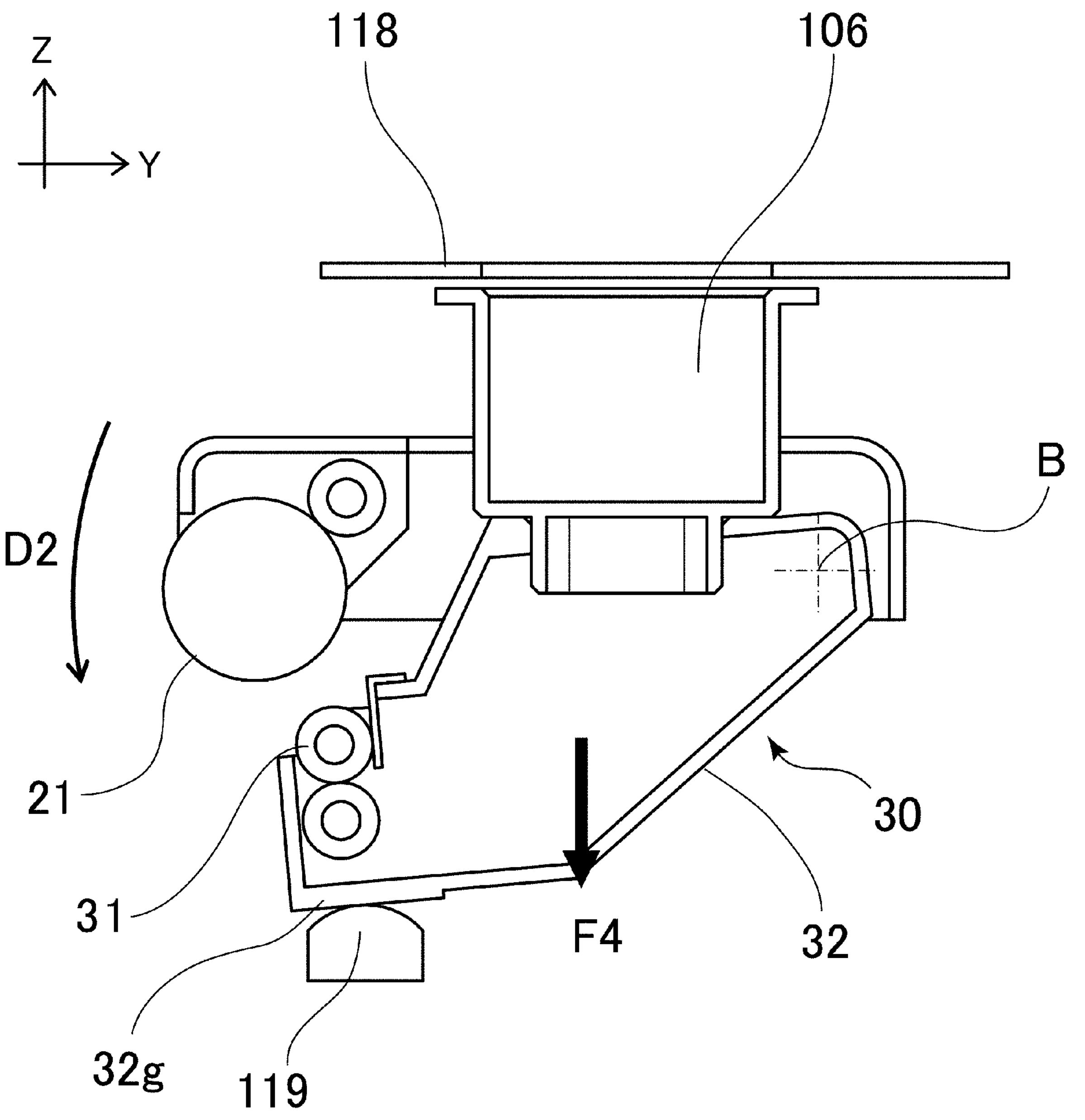

FIG. 10 is an explanatory view showing a process unit in a modified example 1.

Figure 11:
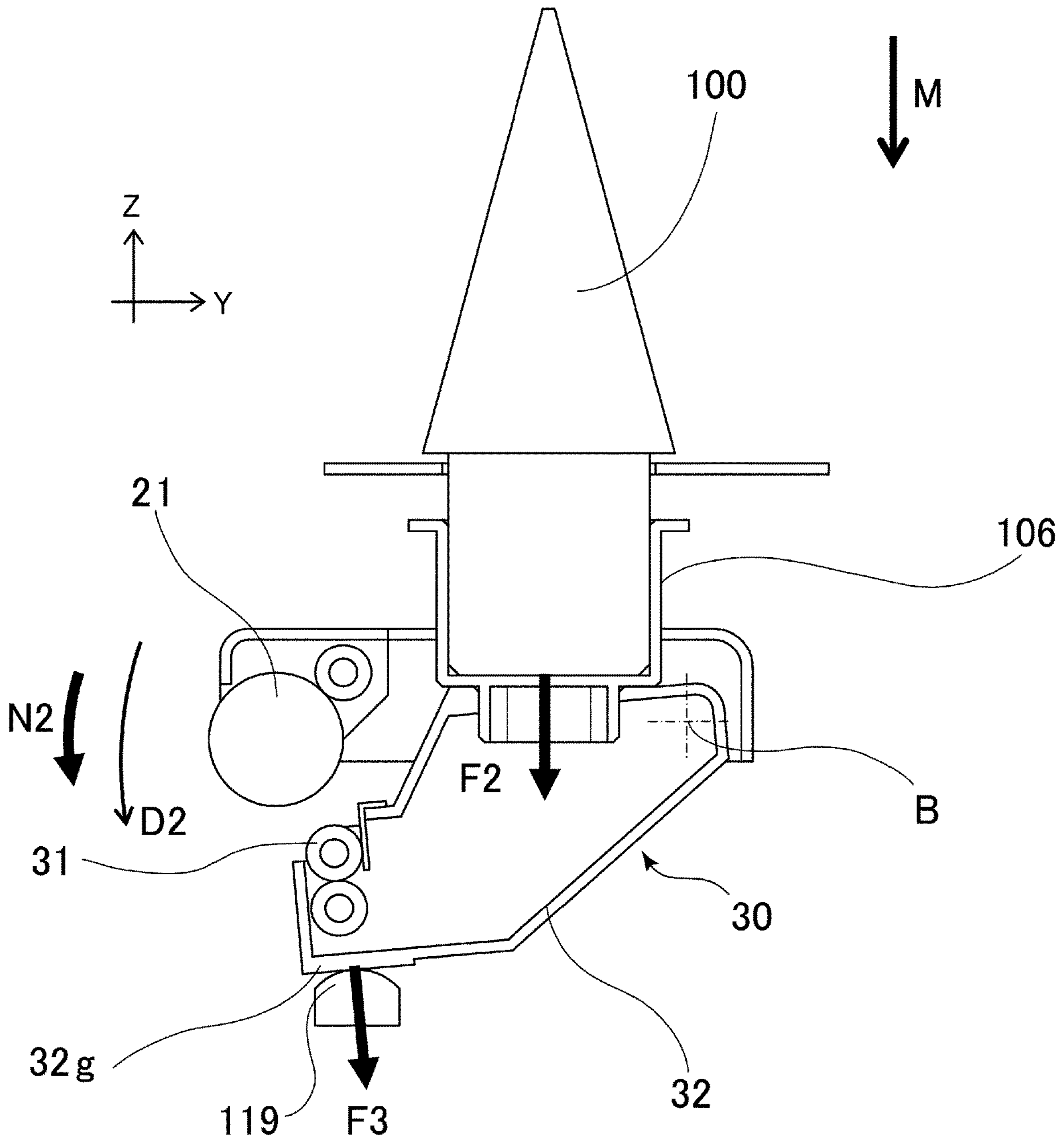

FIG. 11 is an explanatory view showing a process unit in a modified example 2.

Figure 12:
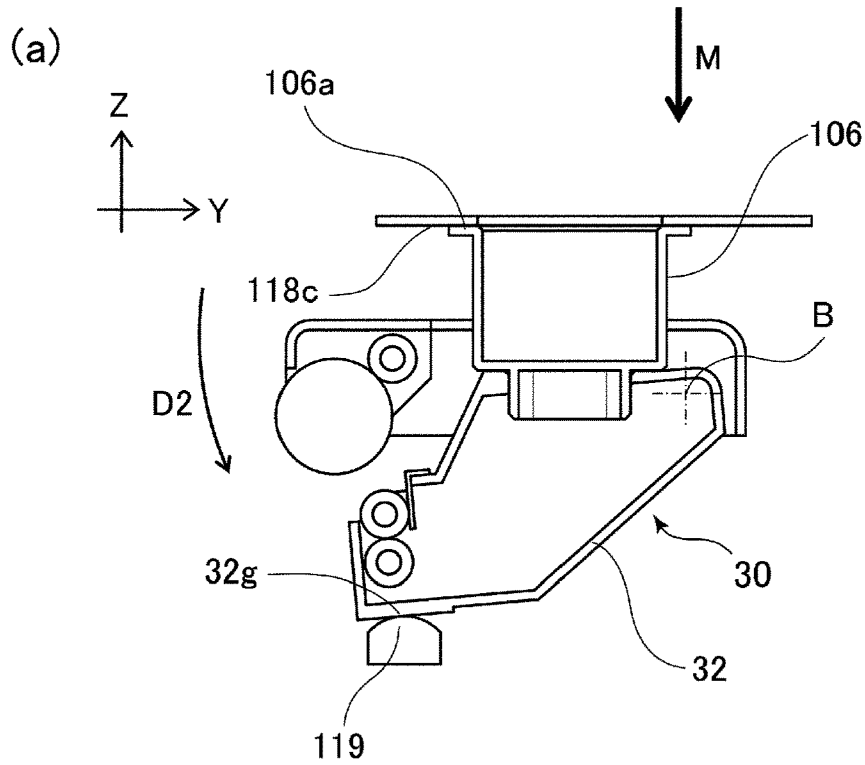
Figure 12:
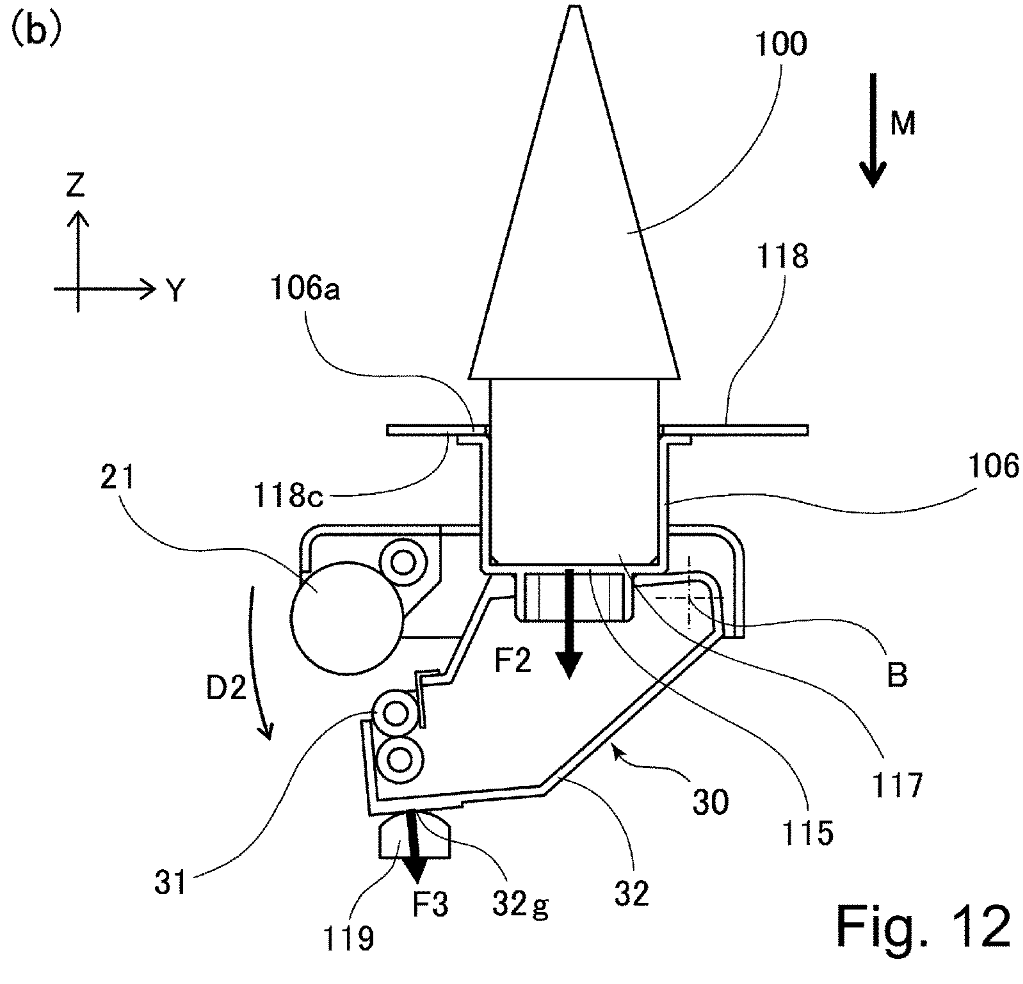

FIG. 12, part (a) and part (b), is an explanatory view showing a process unit in a modified example 3.

Figure 13:
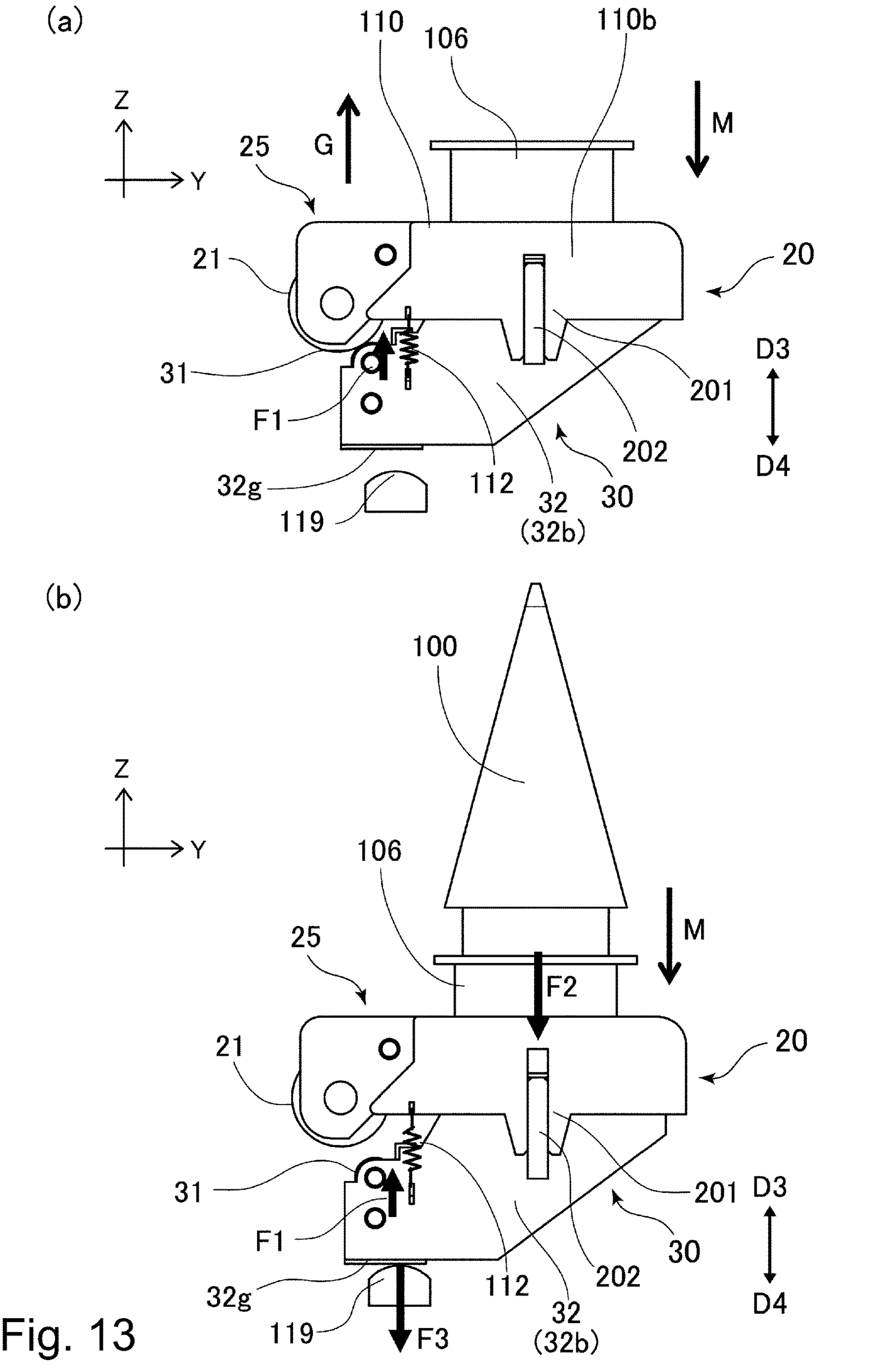

FIG. 13, part (a) and part (b), is an explanatory view showing a process unit in an embodiment 2.

Figure 14:
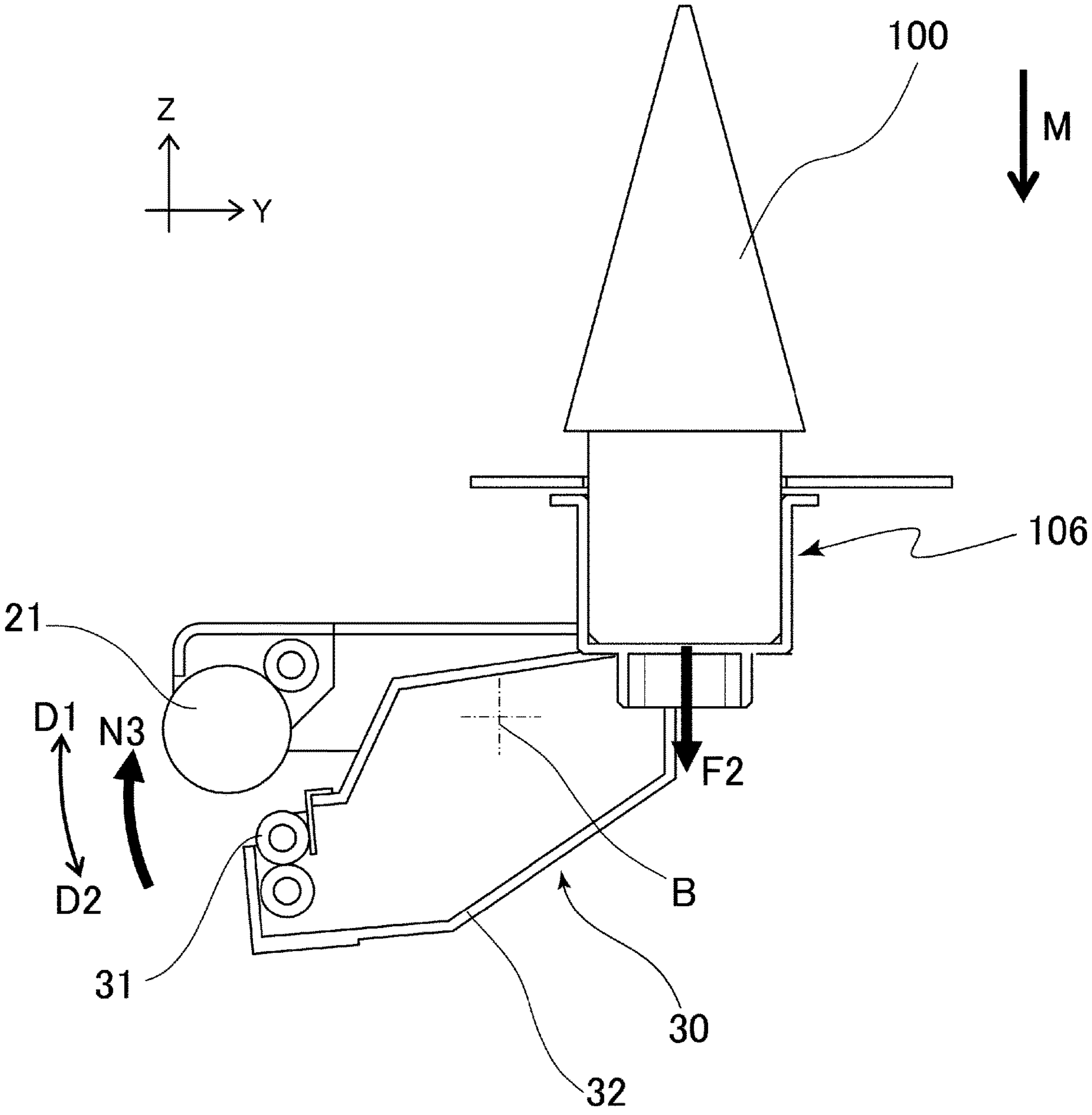

FIG. 14 is a side view showing a process unit in a comparative example.

DESCRIPTION OF THE EMBODIMENTS

As below, embodiments of present disclosures will be exemplary described with referring to the drawings.

Embodiment 1

(Image Forming System)

An image forming system in the embodiment 1 will be described. In the description below, a direction of height (opposite to a gravity direction) of the image forming apparatus is defined as a direction Z when the image forming apparatus is placed on the horizontal surface. A direction which is crossing the direction Z and is parallel to a direction of a rotational axis of a photosensitive drum 21 (a main scanning direction) described below is defined as a direction X. A direction which is crossing both the direction X and Z is defined as a direction Y. The direction X, Y, and Z are preferably crossing each other perpendicularly. Also, on the direction X, a plus (positive) side is called a right side and a minus (negative) side is called a left side, for convenience. On the direction Y, a positive side is called a front side and a negative side is called a back side, a positive side on the direction Z is called an upper side and a negative side of the direction Z is called a lower side as well. In the embodiments of the present disclosure the direction Z is parallel to a vertical direction and the direction X and Y are parallel to a horizontal direction.

Further, shapes and configurations of structures' parts of the image forming apparatus will be described based on a state as they are assembled and installed.

Part (a) of FIG. 2 is a schematic cross-sectional view showing a structure of an image forming system 1000 in the embodiment 1. Part (b) of FIG. 2 is a perspective view of the image forming system 1000. FIG. 3 is a perspective view of an image forming apparatus 1 in which a toner pack 100 is not installed.

The image forming system 1000 includes the image forming apparatus 1, the toner pack 100 (a developer replenishing container, a toner replenishing container, a toner container, and a toner cartridge) as a replenishing container which is detachable (dismountable) to the image forming apparatus.

The toner pack 100 accommodates a toner to replenish the image forming apparatus 1 as mounting on a mounting portion 106 of the image forming apparatus 1 showing in FIG. 3. The toner pack 100 is mounted in a predetermined mounting direction (an arrow M in FIG. 3) to the mounting portion 106 described below of the image forming apparatus 100. When replenishing toner is finished, the toner pack 100 is removed from the mounting portion 106. The image forming apparatus is able to execute an image forming operation described below as a state that the toner pack 100 is detached.

(Image Forming Apparatus)

The image forming apparatus 1 is a monochrome printer that forms an image on a recording material P based on an image data input from an outer device. The recording material P includes papers like a normal paper and a thick paper, a plastic film like an overhead projector sheet, a particular shape sheet like an envelope or an index card, and sheets with a variety of material like fabrics.

As showing in part (a) and (b) of FIG. 2, the image forming apparatus 1 includes an image forming portion 10 that forms an image on the recording material P and a pickup roller 65 feeds the recording material P to the image forming portion 10. Also, the image forming apparatus 1 includes a fixing portion 70 that fixes a toner image formed in the image forming portion 10 on the recording material P and a pair of discharging rollers 80.

The image forming portion 10 includes a scanner unit 11, a process unit 20 with an electrographic method, and a transfer roller 12 that transfers a toner image as a developer image formed on a photosensitive drum 21 in the process unit 20 onto the recording material P. The process unit 20 includes the photosensitive drum 21, a drum unit 25 (a primary unit) including a charging roller 22 and a pre-exposing portion 23, and a developing unit 30 (a secondary unit/a developing device) including a developing roller 31.

The photosensitive drum 21 is a photosensitive member formed into a cylinder shape. The photosensitive drum 21 functions as an image bearing member that carries a latent image and a toner image (a developer image). The photosensitive drum 21 in the present embodiment includes a photosensitive layer made of an organic photosensitive member with negative charge on a base drum formed with aluminum. Also, the photosensitive drum 21 is driven rotationally in the predetermined rotational direction (clockwise in the figure) and with predetermined process speed by a motor.

The charging roller 22 forms a charging portion as contacting on the photosensitive drum 21 with a predetermined contact pressure. Also, by applying a charging high voltage source, a surface of the photosensitive drum 21 is evenly charged with a predetermined potential. In the present embodiment the photosensitive drum 21 is charged with negative charge by the charging roller 22. A pre-exposing portion 23 reduces the charge of a surface potential of the photosensitive drum 21 before reaching the charging portion in order to discharge constantly in the charging portion.

The scanner unit 11 as a pre-exposing means scans and exposes on the surface of the photosensitive drum 21 by emitting a laser corresponding to the image data input from the outer device with a polygon mirror. By this exposing, a latent image corresponding to an image data is formed on the photosensitive drum 21. Note that, the scanner unit 11 is not limited to a laser scanner device but, for example, an LED exposing device including an LED array on which several LEDs are aligned along a longitudinal direction of the photosensitive drum 21 may be adopted.

The developing unit 30 provides a developing roller 31 (developer bearing member) carrying developer, a developing container 32 (developing frame body) which is a frame body of the developing unit 30, and a supplying roller 33 which is able to supply a developer to the developing roller 31. The developing roller 31 and the supplying roller 33 are supported as being able to rotate by the developing container 32. Further, the developing roller 31 is located in the opening portion of the developing container 32 as opposing to the photosensitive drum 21. The supplying roller 33 is in contact with the developing roller 31 as being able to rotate and is supplying a toner as a developer accommodated in the developing container onto the surface of the developing roller 31. Note that, the supplying roller 33 is not necessary if the system can supply enough toner to the developing roller 31.

The developing unit 30 in the present embodiment uses a contact developing method as a developing method. That is, a toner layer carried by the developing roller 31 is in contact with the photosensitive drum 21 at a developing portion (developing area) where the photosensitive drum 21 and the developing roller 31 are opposing. The developing roller 31 is applied with developing voltage by the developing high voltage source. Under the developing voltage, a latent image is developed to a toner image by that the toner carried by the developing roller 31 is transferred onto the surface of the drum from the developing roller 31 according to electric potential distribution of the surface of the photosensitive drum 21. Note that, a reversal development method is adopted in the present embodiment. That is, a toner image is formed by toner depositing on the surface area of the photosensitive drum 21 of which a charge amount is reduced by exposing in an exposing process after being charged in a charging process.

Further, a toner that is 6 μm particle size and negative polarity as a normal charge polarity is adopted. For a toner, a polymerized toner is adopted made by a polymerization method as an example. Furthermore, the toner in the present embodiment does not contain magnetic substances, so to speak, but is a non-magnetic single component developer carried by the developing roller 31 mainly with an intermolecular force or an electrostatic force (image force). However, the single component developer containing magnetic component may be adopted. Also, there is a case that single component developer contains additives (for example, wax or silica fine particle) to adjust toner fluidity or charging performance other than toner particles. Two component developer comprising non-magnetic toner and a carrier including may be used as a developer as well. When the developer including magnetic component is used, for example, a cylinder sleeve that a magnet is provided inside as a developing roller (developer bearing member).

The developing container 32 includes a toner accommodating container 36 (accommodating portion) storing a toner. Inside the toner accommodating container 36 a stirring member 34 (toner conveying member) is provided. The stirring member 34 stirs the toner in the developing container 32 by rotating as driven by a motor not shown in the figures and conveys the toner toward the developing roller 31 and the supplying roller 33. Also, the stirring member 34 functions to cause the toner that is not used for developing and scraped out of the developing roller 31 to circulate in the developing container and uniform the toner in the developing container. Note that, the stirring member 34 is not limited to a rotating system but the stirring member with swinging system may be adopted, for example.

In an opening portion of the developing container 32 where the developing roller 31 is provided, a developing blade 35 restricting the amount of the toner carried by the developing roller 31 is provided. The toner supplied on the surface of the developing roller 31 is evenly thin-layered by going through the opposing portion with the developing blade 35 along the developing roller 31 rotating and is charged negatively by frictional charging.

Next, the image forming operation of the image forming apparatus will be described. As a command to form an image to the image forming apparatus an image forming process in the image forming portion is started based on the image data input from an outer computer connected with the image forming apparatus 1. The scanner unit 11 emits a laser light to the photosensitive drum 21 based on the image data input. The photosensitive drum 21 is charged in advance by the charging roller 22 and a latent image is formed on the photosensitive drum 21 by a laser light being emitted. And then, this latent image is developed by the developing roller 31 and a toner image is formed on the photosensitive drum 21.

In parallel with the image forming process described above, a recording material P is fed by a pick up roller 65 and conveyed to a transfer nip portion formed by a transfer roller 12 and the photosensitive drum 21.

The transfer roller 12 is charged with a transfer voltage from a transfer high voltage source, and a toner image carried by the photosensitive drum 21 is transferred to the recording material P. While the recording material P to which the toner image transferred passes through a fixing portion 70, the toner image is heated and pressed. Thus, the toner particle is melted, and later hardened, and then the toner image is fixed on the recording material P. The recording material P is discharged outside of the image forming apparatus 1 by a pair of discharging rollers 80 as a discharging means after passing the fixing portion 70 and stacked on a discharging tray 81 as a stacking portion formed in the upper part of the image forming apparatus 1.

In the upper part of the image forming apparatus 1 a top cover 82 as a stacking tray is provided and the discharging tray as a stacking surface 81 is formed on an upper surface of the top cover 82. The top cover 82 is provided with an open/close portion 83 supported as being able to open and close as having a rotational axis 83*a* that stretches in a back and forth direction as a center, as shown in part (b) of FIG. 2 and FIG. 3.

Also, in the upper part of the image forming apparatus 1 the mounting portion 106 in which the toner pack 100 is able to be detached (dismounted) is provided. In the discharging tray 81 of the top cover 82 an opening portion 82*a* is formed above. The open/close member 83 is movable between a closing position (cover position) blocking an opening portion 82*a* and an opening portion (exposing position) exposing the opening portion 82*a*.

As shown in FIG. 3, the mounting portion 106 is exposed through the opening portion 82*a* when the open/close member 83 is moved to the opening position. When the open/close member 83 is in the opening position, the toner pack 100 is allowed to be mounted to the image forming apparatus 1. When the open/close member 83 is in the closing position, the toner pack 100 is restricted to be mounted to the image forming apparatus 1. Note that, a whole part of the discharging tray 81 may be formed by the open/close member which is able to open and close for the casing of the image forming apparatus 1.

The open/close member 83 functions as a part of the discharging tray 81 at the closing position. In other words, when the open/close member 83 is in the closing position, the open/close member 83 is allowed to discharge and stack the recording material P on which the image is formed by the image forming operation to the discharging tray 81.

The open/close member 83 and the opening portion 82*a* is formed on the left side of the discharging tray 81 when the image forming apparatus 1 is seen from the front side. The front side of the image forming apparatus 1 described here is an upstream side of the image forming apparatus 1 in a direction which the recording material P is fed by the pick up roller 65. Also, the open/close member 83 is opened to the left by a user's finger hooking a gap portion 82*b* provided in the top cover 82.

The opening portion 82*a* of the discharging tray 81 opens as the mounting portion 106 is exposed when it is seen from above, and a user can access the mounting portion 106 while the open/close member 83 is opened. In the present embodiment a method that a user mount the toner pack 100 to the mounting portion 106 to replenish toner from the toner pack 100 to the developing unit 30 in the state that the developing unit 30 is mounted to the image forming apparatus 1 (toner replenishing method, direct replenishing method) is adopted. At least a part of the toner pack 100 is exposed to the outside of the image forming apparatus 1 in the state that the toner pack 100 is mounted to the mounting portion 106 of the image forming apparatus 1.

Since work to remove the process unit 20 from the image forming apparatus 1 and replace a new process unit is not necessary when the amount of the toner in the process unit 20 is low, usability is improved. Also, the toner is replenished to the developing container with lower cost than replacing the entire process unit 20. Note that, the direct replenishing method is able to reduce cost as compared with a case of replacing the developing unit 30 only of the process unit 20 because each of roller or gear is not needed to replace.

(Supporting Structure of the Developing Unit)

Next, a supporting structure of the developing unit 30 in the process unit 20 will be described with FIGS. 4, 5, and 6. Note that, in a direction (direction X) along a rotational axis A1 of the photosensitive drum 21, a side where the photosensitive drum 21 receives a driving force from a driving source is defined as a driving side (side +X) and an opposite side is defined as a non-driving side (side −X). The driving side is a first end of the rotational axis A1 of the photosensitive drum 21 and the non-driving side is a second side of the rotational axis A1.

FIG. 4 is a perspective view of the process unit 20 seen from the driving side. FIG. 5 is a perspective disassembling view of the process unit 20 seen from the non-driving side. FIG. 6 is a side view of the process unit 20 seen from the non-driving side.

As shown in FIG. 4, the process unit 20 includes a drum unit 25 including the photosensitive drum 21 and the developing unit 30 including the developing roller 31. The drum unit 25 includes a drum frame body 110 supporting the photosensitive drum 21 as being able to rotate as having the rotational axis A1 as a center. The drum frame body 110 may be provided with, for example, the charging portion described above other than structures described below.

In the end of the driving side of the photosensitive drum 21 an input portion 21*a* (driving force receiving portion, coupling) for receiving a driving force input from a driving source is provided. Also, to the developing container 32 comprising the developing unit 30, the mounting portion 106 described with part (a) and part (b) of FIG. 2 and FIG. 3 is fixed. In other words, the developing unit 30 in the present embodiment includes the mounting portion 106 configured to be mountable with the replenishing container (toner pack 100). The mounting portion 106 is a receiving portion which accommodates a part of the replenishing container mounted to the image forming apparatus 1 and receives toner discharged from the replenishing container. In the present embodiment the mounting portion 106 is located in the end of the non-driving side of the developing container 32.

As shown in FIG. 5, in a first side board 110*a* that is a side board on the driving side of the drum frame body 110, a first hole portion 110*c* is provided and a second hole portion 110*d* is provided in a second side board that is a side board on the non-driving side. On the other hand, in a first side board 32*a* that is a side board on the driving side of the developing container 32, a first boss 32*c* is provided and a second boss 32*d* is provided in a second side board 32*b* that is a side board on the non-driving side. The developing unit 30 is supported by the drum frame body 110, as the first boss 32*c* fitting in the first hole portion 110*c* and the second boss 32*d* fitting in the second hole portion 110*d*. In other words, the developing unit 30 is combined with the drum unit 25.

A virtual line connecting a center of the first boss 32*c* fitting in the first hole portion 110*c* and a center of the second boss 32*d* fitting in the second hole 110*d* is defined as a swinging axis B. The swinging axis B is practically parallel to each of the rotational Axis A1 of the photosensitive drum 21 and a rotational axis of the developing roller 31. Also, the position of the swinging axis B is located in the opposite end where the photosensitive drum 21 is (right side of FIG. 4) both on the first side board and on the second side board as seen in the direction X.

The developing unit 30 in the present embodiment is able to swing (move) as having the swinging axis B as a center with respect to the drum unit 25. More specifically, the developing container 32 which is a frame body of the developing unit is able to swing around the swinging axis B with respect to the drum frame body 110 that is a frame body of the drum unit 25. In other words, the moving direction of the developing unit 30 in the present embodiment is a direction that is along a perimeter of a virtual circle having the swinging axis B as a center (rotating direction around the swinging axis B) as seen in the direction X. Note that, though the developing unit 30 is combined with the drum unit 25 in the present embodiment as described above, the developing unit may be independent from the drum unit 25.

The developing unit 30 is movable to a contact position (a first position) where the developing roller 31 is in contact with the photosensitive drum 21 and to a separating position (a second position) where the developing roller 31 is separating from the photosensitive drum 21 with respect to the drum unit 25. The separating position in the present embodiment is where the developing unit 30 moves according to the open/close member 83 opening as described below (shown in part (b) of FIG. 8). Hereinafter, a direction that goes toward the contact position from the separating position is defined as a contact direction D1 and a direction that goes toward the separating position from the contact position is defined as a separating direction D2 in the moving direction of the developing unit 30.

The process unit 20 is provide with a spring member as an urging member urges the developing unit 30. As shown in FIG. 5, the first spring 111 is provided on the driving side of the process unit 20 and the second spring 112 is provided on the non-driving side. The first spring is a tension spring connected to each of a hook 110*e* provided on the first side board 110*a* of the drum frame body 110 and a hook 32*e* provided on the first side board 32*a* of the developing container 32. The second spring 112 is a tension spring connected to each of a hook 110*f* provided on the second side board 110*b* of the drum frame body 110 and a hook 32*f* provided on the second side board 32*b* of the developing container 32.

As shown in FIG. 6, by an urging force F1 which is a resultant force of a elastic force (restoring force) of both the first spring 111 and the second spring 112, the developing unit 30 receives a moment N1 (a moment of a force: hereinafter, moment of force is simply referred as moment in the present disclosure) in a contact direction D1. Thus, the developing unit 30 is held at the contact position and the developing roller 31 is pressed with a predetermined pressure force by the photosensitive drum 21.

(Mounting Process)

Next, a mounting process in which the toner pack 100 is mounted to the mounting portion 106 will be described with FIG. 1, part (a) and (b) of FIG. 7, part (a) and (b) of FIG. 8, and FIG. 9.

Figure 1:
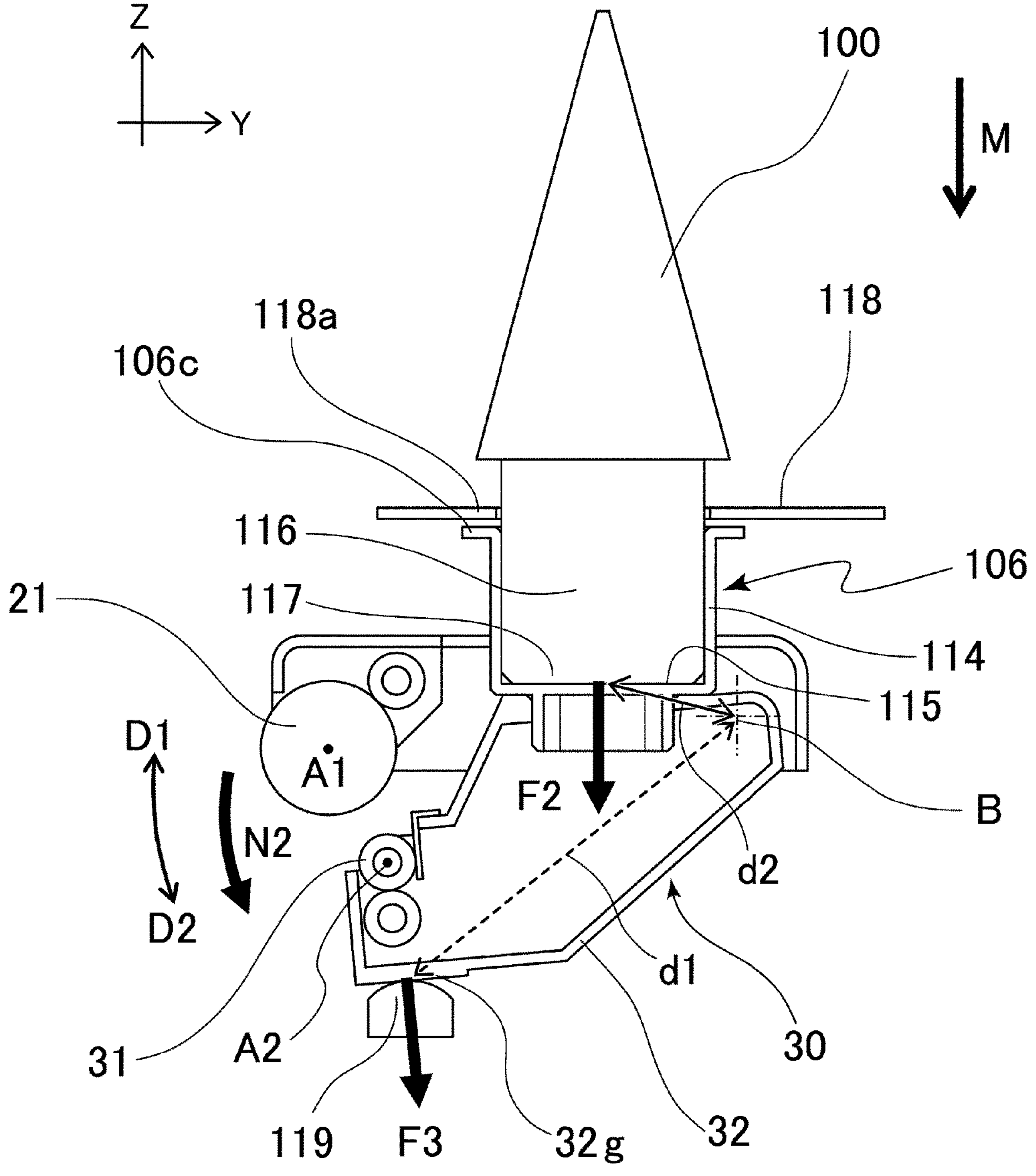
FIG. 1 is an explanatory view showing a process unit in an embodiment 1.

FIG. 1 is a cross-sectional view of the process unit 20 showing the state that the toner pack 100 is mounted to the mounting portion 106. Part (a) of FIG. 7 shows the opening portion 82*a* when the open/close member 83 is at the closing position. Part (b) of FIG. 7 shows the opening portion 82*a* when the open/close member 83 is at the opening position. Part (a) of FIG. 8 is a cross-section view of the mounting portion 106 when the open/close member 83 is at the closing position. Part (b) of FIG. 8 is a cross-section view of the mounting portion 106 when the open/close member 83 is at the opening position. FIG. 9 is a perspective view of the toner pack 100.

As shown in FIG. 7(*a*), in an opening portion 82*a* located on an upper surface of the image forming apparatus 1, a pressing plate 118 including an opening 118*b* is provided. The pressing plate 118 includes a rack shape 118*a*. The open/close member 83 includes a gear portion 83*b* provided around the rotational axis 83*a*. By the gear portion 83*b* engaging with the rack shape 118*b*, the pressing plate 118 is configured to move in interrelation with opening and closing of the open/close member 83.

As described above, the open/close member 83 is able to rotate about the rotational axis 83*a* as a center and move to the closing position (FIG. 7(*a*)) and to the opening position (FIG. 7(*b*)). As the open/close member 83 rotates from the closing position to the opening position in a direction of an arrow D, the pressing plate 118 moves in a direction of an arrow M. Also, as the open/close member 83 rotates from the opening position to the closing position in an opposite direction of the arrow D, the pressing plate 118 moves in an opposite direction of the arrow M. In the present embodiment, the arrow M is almost vertical and the pressing plate 118 goes down as the open/close member 83 opening and goes up as the open/close member 83 closing.

When the pressing plate 118 moves in the direction of the arrow M from the state (which the open/close member 83 is close) as shown in FIG. 8(*a*), a pressing surface 118*c* (underside) of the pressing plate 118 presses the pressed surface 106*a* of the mounting portion 106. Therefore, the developing unit 30 swings in the separating direction D2 having the swinging axis B as a center against the urging force (moment N1) of the first spring 111 and the second spring 112 (shown in FIG. 8(*b*)). Thus, the developing roller 31 is separating from the photosensitive drum 21.

Further, when the developing unit 30 moves from the separating position to the contact position, a contact portion 32*a* provided in the developing container 32 is configured to move closer to a contacted portion 119 provided in the image forming apparatus 1. The contacted portion 119 functions as a restricting portion (a stopper) that is able to restrict the developing unit 30 to move in the separating direction D2 by contacting the developing unit 30. The contacted portion 119 is a member fixed to the main body (frame body) of the image forming apparatus 1.

As shown in FIG. 9, the toner pack 100 includes a bag portion 100*a* (toner accommodating container) made of a soft material such as a resin film and a nozzle portion 100*b* which is a connecting interface with the image forming apparatus 1. The nozzle portion 100*b* includes an outer peripheral surface 116 that is roughly a cylinder shape and an edge portion 117 that is located on the bottom of the cylinder. Also, inside the nozzle portion 117 an opening which communicates with the interior space of the bag portion 100*a* is provided. The outer peripheral surface 116 and the edge portion 117 function as a shutter which is able to move between a position where the opening is covered and a position where the opening is exposed.

On the other hand, as shown in FIG. 8(*b*), the mounting portion 106 includes an inner peripheral surface 114 that is a cylinder shape roughly and a bottom surface portion 115 that is located on the bottom of the cylinder. When the toner pack 100 is mounted to the mounting portion 106 through the opening 118*b* in the pressing plate 118 in the direction of the arrow M, the outer peripheral surface 116 of the toner pack 100 is engaged with the inner peripheral surface 114 of the mounting portion 106 as shown in FIG. 1. At the same time, the edge portion 117 of the toner pack 100 is in contact with the bottom surface portion 115 of the mounting portion 106. As a user presses harder the toner pack 100 in the direction of the arrow M, the mounting portion 106 receives a mounting force F2 more in the direction of the arrow M. The developing unit 30 is configured to be urged in the separating direction D2 by the mounting force F2 that the mounting portion receives from the toner pack 100 as the toner pack is attached to the mounting portion 106.

In the other words, the developing unit 30 in the present embodiment is configured to receive an action of the force which the mounting force F2 that the mounting portion 106 receives from the toner pack 100 urges to move the developing unit 30 in the separating direction D2. In the present embodiment, a moment N2 around the swinging axis B is generated by the mounting force F2 and the developing unit 30 is urged to move in the separating direction D2. The direction of the moment N2 is corresponding to the separating direction D2 of the developing unit 30 which is the rotational direction around the swinging axis B.

In the present embodiment, the mounting portion 106 is configured to receive the mounting force F2 at the position between the swinging axis B and the rotational axis A2 of the developing roller 31 with respect to the direction that is perpendicular to the swinging axis B. In the present embodiment the rotational axis A2 of the developing roller 31 is located lower than the rotational axis A1 of the photosensitive drum 21. Further, the mounting portion 106 is configured to be attached with the toner pack 100 from above in the direction Z (in the other words, the mounting direction is downward with respect to the direction Z). Then, the mounting portion 106 is located between the rotational axis A1 of the photosensitive drum 21 and the swinging axis B in the horizontal direction as seen in the direction X as shown in FIG. 1. At the same time, the mounting portion 106 is located between the rotational axis A2 of the developing roller 31 and the swinging axis B in the horizontal direction. Furthermore, with respect to the direction that is perpendicular to the swinging axis B, a distance between the mounting portion 106 and the swinging axis B is shorter than a distance between the rotational axis A2 and the swinging axis B or a distance between the rotational axis A1 and the swinging axis B. Here, the mounting force F2 is a resultant force of forces that each part of the mounting portion 106 receives from the toner pack 100. The position of the mounting portion 106 is based on the center of the bottom portion 115 which is an acting point of the mounting portion 106.

By the configuration described above, when the mounting portion 106 receives the mounting force F2 downward from the toner pack 100, the moment N2 is generated that the developing roller 31 is going to move downward (i.e. the separating direction D2) in the developing unit 30. Therefore, in the present embodiment the developing unit 30 swings in the separating direction D2 and pauses by that the contact portion 32*a* of the developing container 32 is in contact with the contacted portion 119 of the main body of the apparatus.

Thus, the mounting force generated when a user mounts the toner pack 100 acts as a force that is going to have the developing unit 30 move to the separating D2. Even if a user mounts the toner pack 100 with a strong force carelessly and the greater mounting force F2 is applied, the contacted portion 119 receives the force as a contact force F3 from a contact portion 32*g* to the contacted portion 119. Therefore, the developing roller 31 is prevented from collision with the photosensitive drum 21 by the mounting force F2.

As described above, according to the present embodiment, it is possible to offer the image forming apparatus that provides a new configuration which is able to prevent the force by mounting the replenishing container from affecting the photosensitive drum through the developing roller.

As a comparative example, the case in which the force acts in the direction which the developing roller 31 moves closer to the photosensitive drum 21 with respect to the developing unit 30 by the mounting force F2 will be discussed. For example, as shown in FIG. 14, the mounting portion 106 is located in the plus side in the direction Y than the swinging axis B. In this case, as the mounting portion 106 receives the mounting force F2 from the toner pack 100, a moment N3 in a contact direction D1 (clockwise direction in the figure) acts to the developing unit 30.

However, in the comparative example, there is a possibility occurring the breakage of members when the mounting force exceeds the strength of the supporting member that keeps the developing unit 30 in a separating position (such as the gear portion 83*b*, the rack shape 118*a* in FIG. 7(*b*), or supporting member in Japanese Laid-Open Patent Application No. 2022-85402). If the strength of each member is enhanced to prevent the members from breaking, the members increase the size and the weight, therefore, the image forming apparatus 1 increases in size and weight.

On the other hand, according to the present embodiment, since the developing unit 30 receives the force which the mounting force F2 has the developing unit 30 move in the separating direction D2, the developing unit 30 is never going to move in the contact direction D1 even if the mounting force is greater. Therefore, it is possible to prevent the image forming apparatus from increasing the size or the weight unnecessarily. In other words, according to the present embodiment, it is possible to prevent the force for mounting the replenishing container from affecting the photosensitive drum through the developing roller with a simple configuration.

Note that, as shown in FIG. 1, a distance d1 from the swinging axis B of the developing unit 30 to the contacted portion 119 (restricting portion) is preferable to be longer than a distance d2 from the swinging axis B to the mounting portion 106 as seen in the direction X. While the developing unit 30 receives the moment N2 in the separating direction D2 as mounting the toner pack 100 in the present embodiment, according to the configuration described above, it is possible the contacted portion 119 to reduce the size and the weight because a contact force F3 that the contacted portion 119 receives from the developing unit 30 is less than the mounting force F2 by principle of leverage. Therefore, since a required strength of the contacted portion 119 is decreased, it is possible the contacted portion can be reduced in size and weight. Note that, the distance d1 may be shorter than the distance d2 in a layout, if the strength of the contacted portion 119 is secured enough.

Modified Example 1

In the embodiment 1, the configuration that, the developing unit 30 is moved from the contact position to the separating position by the action of the pressing plate 118 (shown in FIG. 7 (*a*) and (*b*), FIG. 8 (*a*) and (*b*)) in interrelation with the open/close member 83 as following the operation that the open/close member 83 opens was described above. This is no limited, but for example, a configuration that the urging force F1 (shown in FIG. 6) of the first spring 111 and the second spring 112 does not act on the developing unit 30 as following the operation that the open/close member 83 opens, may be possible. In this case, as shown in FIG. 10, the developing unit 30 swings in the separating direction D2 by its own weight and pauses as contacting on the contacted portion 119 in the contact portion 32*g* since the open/close member is moved from the closing position to the opening position and the urging force F1 is lost. The operation when the toner pack 100 is mounted in this state is the same as the embodiment 1.

As an example, the first spring 111 and the second spring 112 can be installed with a member that moves as interlocking with the open/close member instead of the hook 110*e* and 110*f* of the drum frame body 110. In this case, the first spring 111 and the second spring 112 are configured to generate the urging force F1 as the same as the embodiment 1 when the open/close member 83 is in the closing position and not to generate the urging force F1 when the open/close member 83 is in the opening position.

Modified Example 2

Further, though the configuration that the developing unit 30 is moved from the contact position to the separating position in interrelation with the operation of the open/close member 83 was described in the embodiment 1, the configuration that the developing unit 30 is not moved from the contact position to the separating position in interrelation with the operation of the open/close member 83 may be possible. FIG. 11 is showing a state that the toner pack 100 is mounted to the mounting portion 106 in a modified example that the developing unit 30 is configured to stay in the contact position even as the open/close member 83 opens. As shown in FIG. 11, even in the case that the toner pack 100 is mounted in the state that the developing unit 30 is in the contact position, the moment N2 in the separating direction D2 acts on the developing unit 30 by the mounting force F2. Therefore, the mounting force F2 is prevented from acting on the photosensitive drum 21 through the developing roller 31 in the present modified example as well.

Modified Example 3

Furthermore, the configuration that the contact portion 32*g* of the developing unit 30 moves closer to the contacted portion 119 as the open/close member 83 is moved to the opening position was described in the embodiment 1. This is not limited to, but, for example, a configuration that the contact portion 32*g* of the developing unit moves to contact onto the contacted portion 119 as the open/close member 83 is moved to the opening position as shown in FIG. 12(*a*) may be possible. In the present modified example, the position where the developing unit 30 is in a state that the contact portion 32*g* is in contact with the contacted portion 119 is the separating position of the developing unit 30.

Even in a case that a user mounts the toner pack 100 and the mounting portion 106 receives the mounting force F2 in the state shown in FIG. 12(*a*), the moment N2 acts on the developing 30 in the separating direction D2 as well. However, unlike the embodiment 1, the developing unit 30 stays without swinging in the separating direction D2 since the contact portion 32*g* is already in contact with the contacted portion 119 (shown in FIG. 12(*b*)). The mounting force F2 is prevented from acting on the photosensitive drum 21 through the developing roller 31 in the present modified example as well.

Other Modified Example

Also, though the first spring 111 and the second spring 112 described in the embodiment 1 are examples of the urging member, an urging member (such as a compression spring, a torsion spring, or a magnet) may be used other than the tension spring.

Also, in the embodiment 1, though the opposite ends of the developing unit 30 of the first spring 111 and the second spring 112 are installed with the hook 110*e* and the hook 110*f* provided in the drum frame body 110, it is not always necessary. For example, the opposite ends of the developing unit 30 of the first spring 111 and the second spring 112 may be installed with a hook provided in the main body of the image forming apparatus 1 (other part than the process unit 20).

Also, the developing unit 30 in the embodiment 1 is configured to be supported by the drum unit 25 by that convex portions (the first boss 32*c* and second boss 32*d*) provided in the developing container 32 are engaged with concave portions (the first hole portion 110*c* and the second hole portion 110*d*) provided in the drum frame body 110. This is not limited to, but, for example, a concave portion may be provided in the developing container 32 and a convex portion that engages with this concave portion may be provided in the drum frame body 110.

Embodiment 2

Next, a configuration of a process unit 20 relating to an embodiment 2 will be described with FIGS. 13 (*a*) and 13 (*b*). Hereinafter, since items with common reference numerals of the embodiment 1 is defined as practically the same configuration and action included as described in the embodiment 1, items and parts that are different from the embodiment 1 will be mainly described.

FIG. 13 (*a*), is a side view showing the process unit 20 before a toner pack 100 is mounted to an mounting portion 106. FIG. 13 (*b*), is a side view showing the process unit 20 mounted with the toner pack 100 to the mounting portion 106.

The configuration that the developing unit 30 swings with respect to the drum unit 25 was described in the embodiment 1. In the present embodiment, a configuration in which a developing unit 30 slides with respect to a drum unit 25 will be described.

As shown in FIG. 13 (*a*), a guide slit 201 extending in a direction of an arrow M which is a mounting direction of a toner pack 100 is provided in a second side plate 110*b* of a drum frame body 110. A same guide slit is provided in a first side plate 110*a* as well. On the other hand, a guided rib 202 extending in the direction of the arrow M is provided in a second side surface 32*b* of a developing container 32 and engaged with the guide slit 201 in the second side plate 110*d*. A same guided rib 202 is provided in a first side surface 32*a* and engaged with a guide slit 201 of a first side plate 110*a* as well. Therefore, a moving direction of the developing unit 30 with respect to the drum unit 25 is restricted in a direction that is along the guide slit 201.

Hereinafter, among directions along the guide slit 201, a direction which the developing unit 30 moves as a developing roller 31 moves closer to a photosensitive drum 21 is defined as a contact direction D3. Also, among directions along the guide slit 201, a direction which the developing unit 30 moves as a developing roller 31 moves to separate from a photosensitive drum 21 is defined as a separating direction D4.

The developing unit 30 is urged by a first spring 111 (not shown in FIGS. and a second spring 112 as well as the embodiment 1. A direction of an urging force F1 of the first spring 111 and the second spring 112 is opposite direction (a direction of an arrow G) of an mounting direction (a direction of an arrow M) of the toner pack 100. When the toner pack 100 is not mounted, the developing roller 31 is in contact with the photosensitive drum 21 by the urging force of the first spring 111 and the second spring 112.

As shown in FIG. 13 (*b*), when a user mounts the toner pack 100 to the mounting portion 106, by a mounting force F2 which the mounting portion 106 receives, the developing unit 30 moves in the direction of the arrow M as the guide slit 201 guides the guided rib 202 against the urging force F1. Therefore, the developing roller 31 separates from the photosensitive drum 21. The developing unit 30 moves to a position where a contact portion 32*g* of a developing container 32 is in contact with a contacted portion 119 of an image forming apparatus 1 and pauses by the contacted portion 119.

Thus, the developing unit 30 in the present embodiment is configured to receive action of a force, by the mounting force F2 that the mounting portion 106 receives from the toner pack 100, which makes the developing unit 30 move in the separating direction D4. In other words, a direction of the mounting force F2 in a direction which the developing unit 30 slides with respect to the drum unit 25 corresponds to the separating direction D4.

By this configuration, since the developing unit 30 is going to move in the separating direction D4 by the mounting force F2 that the mounting portion 106 receives from the toner pack 100, the mounting force F2 is prevented from applying to the photosensitive drum 21 through the developing roller 31. Note that, the developing unit 30 moves in the separating direction D4 to the position where a contact portion 32*g* of the developing container 32 is in contact with the contacted portion 119 of the main body of the apparatus and pauses by the contacted portion 119.

As described above, according to the present embodiment, it is possible to provide the image forming apparatus that provides a new configuration which is able to prevent the force by mounting the replenishing container from affecting the photosensitive drum through the developing roller as well.

Modified Example

In embodiment 2, the configuration in which the guided rib 202 (convex portion) provided in the developing unit 30 is guided along the guide slit 201 (gutter portion, concave portion) provided in the drum unit 25 was described. Instead of this, the guide slit 201 may be provided in the developing unit 30 and the guided rib 202 may be provided in the drum unit 25.

Also, in the embodiment 2, though the case that the mounting direction (direction of the arrow M) of the toner pack 100 is practically parallel to the moving direction of the developing unit 30 (an extending direction of the guide slit 201) was described, the mounting direction may cross the moving direction of the developing unit 30. In this case, an angle between the developing unit 30 and the separating direction D4 may be less than 90° degree (preferably less than 45°, more preferably less than) 30°). Thus, the same advantage as the embodiment 2 is obtained since the developing unit 30 is going to move in the separating direction by the mounting force F2.

Other Embodiment

Though the configuration in which the developing unit 30 swings (revolves, rotates) with respect to the drum unit 25 was described in the embodiment 1 and the configuration in which the developing unit 30 slides with respect to the drum unit 25 was described in the embodiment 2, the way that the developing unit 30 moves is not limited to these. The developing unit may be configured to move along a track combined swinging and sliding with respect to the drum unit 25. In this case, 'the separating direction' means a direction that the developing unit 30 moves as the developing roller 31 is separating from the photosensitive drum 21 among the moving directions of the developing unit 30 along the track.

According to the present invention, it is possible to provide the image forming apparatus that provides a new configuration which is able to prevent the force by mounting the replenishing container from affecting the photosensitive drum through the developing roller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-137307 filed on Aug. 30, 2022, which is hereby incorporated by reference herein in its entirety.

What is claimed is:

1. An image forming apparatus to which a replenishing container for replenishing toner is detachably mountable, the image forming apparatus comprising:

a first unit including an image bearing member; and a second unit including a developing roller configured to supply the toner to the image bearing member, a mounting portion in which the replenishing container is dismountably mounted, and an accommodating portion configured to accommodate the toner replenished from the replenishing container, the second unit being movable between a first position where the developing roller contacts the image bearing member and a second position where the developing roller separates from the image bearing member, wherein when a moving direction in which the second unit moves from the first position toward the second position is defined as a separating direction, the second unit is configured to be urged in the separating direction by a force which the mounting portion receives from the replenishing container when the replenishing container is mounted to the mounting portion.

2. An image forming apparatus according to claim 1, wherein the second unit is swingable about a swing axis relative to the first unit, and wherein a moment about the swing axis by the force is generated such that the second unit is urged in the separating direction.

3. An image forming apparatus according to claim 2, further comprising a restricting portion capable of restricting movement of the second unit in the separating direction by contacting the second unit, wherein as viewed in a rotational axis direction of the image bearing member, a distance from the swing axis to a contacting position of the restricting portion and the second unit is longer than a distance from the swing axis to the mounting portion.

4. An image forming apparatus according to claim 1, wherein the second unit is swingable about a swing axis relative to the first unit, wherein a rotational axis of the developing roller is positioned below a rotational axis of the image bearing member, wherein the mounting portion is configured such that the replenishing container is mounted from an upper side in a vertical direction, and wherein as viewed in a rotational axis direction, the mounting portion is positioned between the rotational axis of the image bearing member and the swing axis with respect to a horizontal direction.

5. An image forming apparatus according to claim 4, wherein the first unit includes a frame member, wherein the frame member includes a first side plate provided on a first end side of the rotational axis of the image bearing member and a second side plate provided on a second end side of the rotational axis, and wherein the second unit is swingably supported in an end portion, of the first side plate and the second side plate, on a side opposite to the image bearing member.

6. An image forming apparatus according to claim 1, wherein the second unit is swingable about a swing axis relative to the first unit, and wherein the mounting portion is configured to receive the force in a position between the swing axis and a rotational axis of the developing roller with respect to a direction perpendicular to the swing axis.

7. An image forming apparatus according to claim 1, wherein the second unit is swingable about a swing axis relative to the first unit, and wherein a distance between the mounting portion and the swing axis is shorter than a distance between a rotational axis of the developing roller and the swing axis with respect to a direction perpendicular to the swing axis.

8. An image forming apparatus according to claim 1, wherein the second unit is configured to linearly move relative to the first unit.

9. An image forming apparatus according to claim 1, further comprising an opening and closing member movable to a closing position for covering the mounting portion and to an opening position for exposing the mounting portion, wherein the second unit is configured to move from the first position to the second position in interrelation with movement of the opening and closing member from the closing position to the opening position.

10. An image forming apparatus according to claim 9, further comprising a restricting portion capable of restricting movement of the second unit in the separating direction by contacting the second unit, wherein in a state in which the opening and closing member is positioned in the opening position and the replenishing container is not mounted to the mounting portion, the second unit does not contact the restricting portion, and wherein when the opening and closing member is positioned in the opening position and the replenishing container is mounted to the mounting portion, the second unit moves to a position where the second unit contacts the restricting portion by the force.

11. An image forming apparatus according to claim 9, further comprising a restricting portion capable of restricting movement of the second unit in the separating direction by contacting the second unit, wherein the second unit moves to a position where the second unit contacts the restricting portion in interrelation with movement of the opening and closing member from the closing position to the opening position.

12. An image forming apparatus according to claim 1, wherein an image forming operation for forming an image on a recording material is capable of executing in a state in which the replenishing container is dismounted.

* * * * *